June 26, 1956 R. J. JOY 2,751,852
MONORAIL-TYPE CONVEYOR WITH DISENGAGABLE DRIVE
Filed Nov. 2, 1953
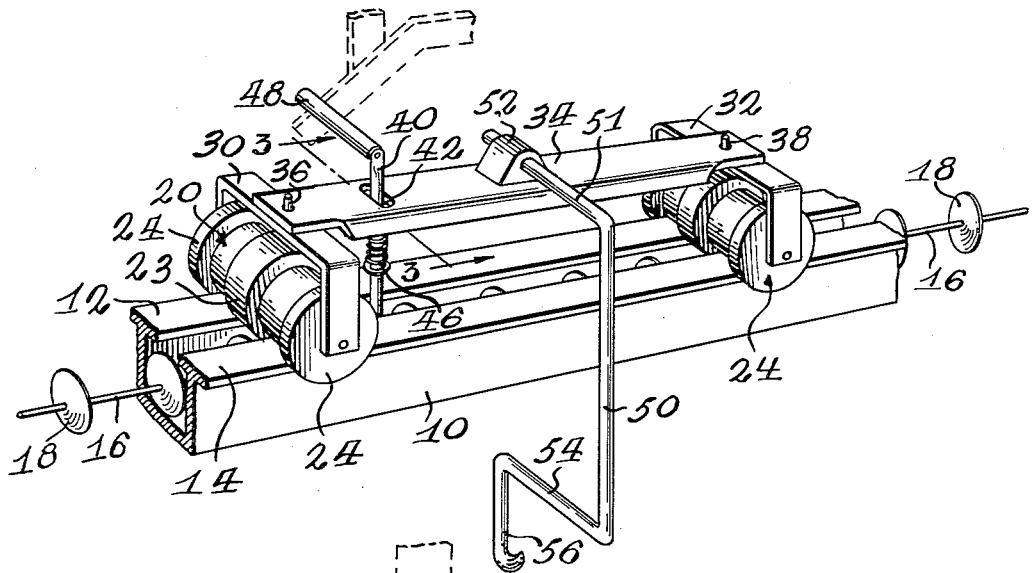
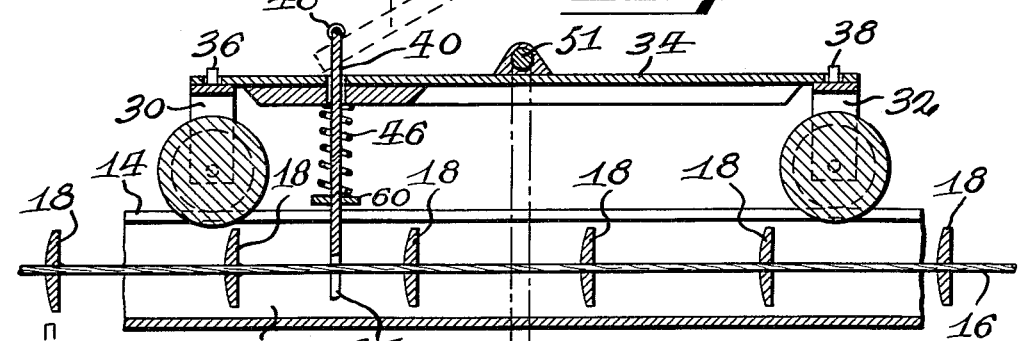
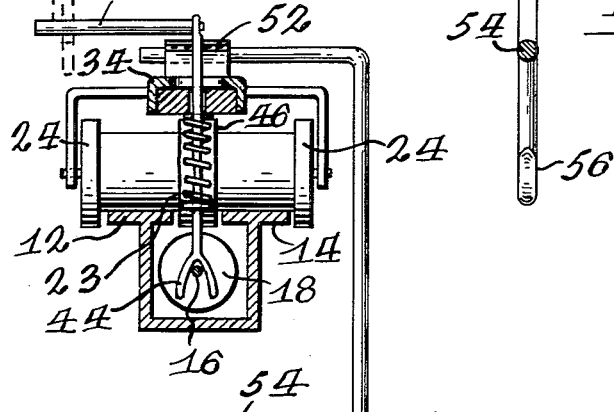
Inventor
Richard J. Joy
By Alan Swabey
Attorney United States Patent Office
2,751,852
Patented June 26, 1956

2,751,852

MONORAIL-TYPE CONVEYOR WITH DISENGAGEABLE DRIVE

Richard J. Joy, Montreal, Quebec, Canada

Application November 2, 1953, Serial No. 389,818

5 Claims. (Cl. 104—94)

The present invention relates to the manufacture of conveyors and, more particularly, to conveyors of the monorail type.

While there are many and varied forms of monorail-type conveyors at present available, the majority of these comprise essentially of a main narrow supporting rail or cable on which a wheeled carriage is mounted, with the motive power supplied from a separate cable attached to the carriage or, alternatively, carried directly by the carriage and applied to the cable or rail as a friction drive.

There are other types of monorail conveyors wherein a continuously moving cable is employed, usually of the endless type, and the supporting carriage is engaged and disengaged from this cable at the various stations by the gripping or release of friction jaws.

While these prior art types of monorail conveyors are suited for the various types of work for which they are designed, none of them is particularly suitable for use in an industrial plant where the use of uncovered endless cables would form a potential safety hazard to the employees. Further, the use of individual motors or motive power on each of the conveyor carriages is costly and impractical for most industrial plant uses.

The present invention recognizes these problems and aims to provide a simple solution for them by providing a monorail conveyor system which is simple and sturdy in design and particularly suited for use in industrial plants.

Accordingly, the invention comprises a monorail-type conveyor with a disengageable drive having the combination of a constantly moving cable at least partially enclosed with the enclosure for the cable or cable-way also forming the guiding track on which wheeled carriages are mounted, with the wheels of each carriage being supported and guided by a split rail arrangement formed by the cable-way housing. Means are provided on the carriage for automatic engagement with and disengagement with the endless cable and a plurality of spaced-apart projections or stops provided on the cable. A load supporting arm or hook is suspended from the central part of the carriage shaped so as to be dependent directly beneath the center line of the carriage so that the weight supported is centralized.

In the preferred construction, the cable-engaging means comprises a slidably mounted cable-engaging member which is resiliently biased so as to be normally maintained in engagement with the cable and cable stops. An offset actuating arm extends from the upper end of the cable-engaging member so that the drive to the carriage can be disengaged automatically by contact with a stop or stops disposed in the path of the arm so as to raise the arm and, consequently, the cable-engaging member.

The wheels of the supporting carriage are preferably shaped so as to have a center wheel or flange which fits between the divided rails and outside wheels or flanges which fit outside of the opposite sides of the divided rails so that the carriage is maintained in axial alignment with the supporting track. These wheels are mounted on common axles each of which is journalled on suitable standards or supports which are pivoted centrally to each end of the main carriage body so as to be capable of travelling easily and quickly around curves or bends in the track. The load-carrying arm is pivoted at its connection with the carriage body so that the conveyor will work efficiently at inclines by maintaining the arm vertical.

As will be appreciated, the cable and cable-supporting and driving members may be any of several known forms of construction with the cable stops being of practically any shape, providing they project beyond the cable sufficiently to be positively engaged by the engaging means of the carriage. The cable-way or supporting track may be square, round, hexagonal or other standard formation in cross section with the lower portions either open or closed relative to the cable. The main requirement is that a substantially horizontal track be provided for the guidance and support of the carriage.

Having thus generally described the nature of the invention, particular reference will be made to the accompanying drawings wherein there is shown by way of illustration a preferred embodiment of a monorail conveyor constructed in accordance with the invention and in which:

Figure 1 is a side view in perspective elevation of a portion of the cable-way or conveyor track, a cable having round disk-like stop members and a wheeled carriage mounted on the cable-way including a dependent supporting hook.

Figure 2 is a cross-sectional view of the construction shown in Figure 1 in the axial direction of the cable-way.

Figure 3 is a cross-sectional view of the construction shown in Figure 1 along the line 3—3.

With particular reference to Figures 1 and 2 of the drawings, a monorail-type conveyor with a disengageable drive constructed in accordance with the present invention is shown as comprising a substantially U-shaped cable-way or supporting housing, having a main body 10 and horizontal flanges 12 and 14 forming a split guiding rail. An endless cable 16 is mounted between suitable wheels or supports and is driven by a suitable driving means so as to constantly pass along the interior of the cable-way body 10. Cable stops or engaging members 18 are disposed along the entire length of the cable 16 in equally spaced-apart relationship and it is by the engagement of these stops that the cable is adapted to drive the conveyor carriage.

The conveyor carriage comprises essentially a spaced-apart pair of combined sets of guiding and supporting wheels or rollers 20, 21, each of which includes a central flange or wheel 23 and end flanges or wheels 24. The central flange 23 on each set fits within the slot provided between the cable-way horizontal flanges 12 and 14 and by the common axle with the end flanges 24 the pressure under side load does not tend to open or close the dividing slot between the two horizontal flanges of the cable-way but is directed to one or other of the end flanges 24, the cable-way merely acting as a guide and vertical support. The combined wheels 20, 21 are mounted for rotation in wheel-supporting frames 30, 32. The frames 30, 32 are pivotally mounted to the main body 34 of the supporting carriage 36, 38 adjacent each end. This pivotal mounting of the combined wheels 20, 21 allows the carriage to travel around bends or curves which may be necessary in the cable-way.

In order that the carriage can be connected to the moving cable 16 a cable-engaging member 40 is provided which extends from a slot 42 provided in the main body 34 of the carriage perpendicularly downwards to terminate in a forked end 44 which is normally urged into engagement with the cable 16 through a light spring 46. The engagement of the forked end 44 of the member 40 of course brings the end 44 into the path of stop members 18 and so the carriage is pulled along by the cable 16. The width of the member end 44 is such that it passes freely between the cable way flanges 12 and 14.

In order that the disengagement of the member 40 may be performed automatically there is provided an outstanding arm or roller 48 which extends at substantially right angles from the member 40 to one side of the carriage. By the placing of a wedge-shaped cam in the path of the arm 48 as it is moved along with the carriage, the arm 48 and consequently the member 40 can be raised between the horizontal flanges 12 and 14 of the cable-way, thus freeing the forked end 44 from engagement with the cable 16 and clear of the stop plates 18. This disengagement of the cable drive will, of course, stop the carriage and suitable buffer or temporary stopping means can be employed at each station or stopping point to avoid further travel of the conveyor carriage through momentum. When it is desired to have the carriage continue on its travel it can be manually pulled forward until the arm 48 is clear of the stop member so that the member 40 is again allowed to descend and engage the forked end 44 with the cable 16.

The load is supported from the conveyor body 34 by means of a hook 50 which is shaped so as to have a first portion 51 which is engaged with a supporting block 52 mounted on the carriage 34 so that the hook 50 can swing or pivot relative to the carriage 34. The lower portion 54 of the hook 50 is shaped so as to extend inwardly to be disposed directly beneath the axial center line of the cable-way 10 and the carriage 34 and terminates in a downwardly extending hook 56 to which the load is to be attached. The pivotal mounting of the hook 50 allows the arm to remain in a vertical position if the conveyor carriage is required to traverse up or down inclines.

As will be appreciated, while the present cable-way 10 is shown as having a substantially U-shaped cross section with transverse horizontal flanges 12 and 14, the cable-way could also be of any other suitable cross section, square, round, hexagonal and so forth, providing there are parallel horizontal portions for the guidance of the conveyor carriage wheels. The cable proper may be totally or partially enclosed within the cable-way, depending on the section employed. The cable 16 may be a straight cable as shown or, alternatively, it might be a chain or other endless arrangement having the necessary flexibility. The stops 18 can be of any suitable shape to agree with the section of the cable-way, providing they extend sufficiently beyond the cable to give a surface against which the cable-engaging member of the carriage can bear.

A main advantage of the present conveyor system over the prior art constructions of this nature, which usually employ carriage-guiding means above and below the supporting and guiding means, is that the carriages are guided and retained in alignment with the guiding track solely by the engagement of the flanges of the wheel assemblies with the top of the guiding surfaces only. With this arrangement each carriage is held in position by its own weight and the load carried only and, if necessary, can be lifted vertically from the track. This freedom of vertical movement of the carriages greatly facilitates the arrangement necessary for the switching of the carriages as no complicated rail system is necessary.

I claim:

1. A monorail-type conveyor comprising in combination, a cable-way of substantially U-shaped form in general cross section with transverse horizontal flanges extending from the top of both sides of said U to constitute spaced-apart supporting surfaces; a flexible driving cable extending within said cable-way section beneath said guiding surfaces; a plurality of stop members mounted on said flexible cable, said stop members extending outwardly from said cable on all sides and being fixed thereto in regular spaced-apart relationship and having a configuration suitable for free passage within said cable-way U-section, a mobile carriage having a main body and spaced-apart wheel assemblies mounted for trans-axial pivotal movement at opposite ends of said body, said mobile carriage being mounted on top of said cable-way guiding surfaces with said wheel assemblies having portions of increased diameter descending beneath and between the top surfaces of said guiding surfaces to prevent lateral displacement of said carriage, said carriage being otherwise free for upward vertical movement relative thereto, a resiliently biased cable-engaging plunger mounted for sliding movement in said carriage body so as to extend perpendicularly downwards therefrom between said cable-way guiding surfaces, said cable-engaging plunger including a bifurcate end portion adapted to fit over said cable and engage with said spaced-apart stop members, a coil spring mounted over said dependent cable-engaging plunger adapted to resiliently urge said plunger into contact with said cable, said cable-engaging plunger having an extended portion projecting transversely outwards to one side and above said carriage body, said extension being adapted to act as a lever raising said cable-engaging plunger from engagement with said cable, and a load-carrying member pivotally mounted to said carriage body and extending beneath said carriage body and cable-way so as to be adapted to suspend a load directly beneath said carriage and cable-way.

2. A monorail-type conveyor as claimed in claim 1 wherein said carriage wheel assemblies are each mounted on a common axle so as to have a projecting central flange and two parallel outer flanges, said central flange being adapted to fit between said cable-way guiding surfaces and said two outer flanges being adapted to overlap the outer marginal edges of said guiding surfaces.

3. A monorail-type conveyor as claimed in claim 1, wherein said mobile carriage dependent load-carrying means comprises a load-supporting hook having one end pivotally mounted on said carriage with the lower end disposed beneath and centrally of said cable-way.

4. A monorail-type conveyor comprising in combination a cable housing having an open top with parallel spaced apart supporting and guiding tracks on said open top, a flexible driving cable extending within said cable housing, a plurality of equally spaced apart stop members secured to said flexible cable, a mobile carriage provided with spaced apart wheels mounted on said cable housing with said wheels engaged with said guiding tracks, a load supporting arm having one end pivotally connected with said carriage with the main portion extending downwardly beneath said carriage and cable housing to terminate in a further load supporting end disposed directly beneath said carriage and cable housing, a resiliently biased cable engaging plunger mounted on said carriage for sliding reciprocal movement relative thereto with the terminal end extending downwardly between said guiding tracks to within said cable housing into contact with any selected one of said stop members, and cam means disposed in the path of said carriage adapted to disengage said cable engaging rod from said stop member.

5. A monorail-type conveyor as claimed in claim 4, wherein said carriage wheels comprise a pair of spaced apart cylindrical rollers of sufficient axial length to span and extend beyond said cable housing guiding tracks at each side, each of said rollers being shaped to have a central portion and end portions of increased diameter relative to the main body thereof, the main portion of each of said wheel members resting on said spaced apart tracks with said central portion fitting between said guiding tracks and said end portions overlapping said guiding tracks at each side.

(References on following page)

References Cited in the file of this patent

UNITED STATES PATENTS

| | | | |
|---|---|---|---|
| 343,319 | Jenkin | June 8, | 1886 |
| 348,329 | Knighton | Aug. 31, | 1886 |
| 476,600 | Benson | June 7, | 1892 |
| 841,821 | Smead | Jan. 22, | 1907 |
| 1,000,106 | Morris | Aug. 8, | 1911 |
| 1,454,937 | Martin | May 15, | 1923 |
| 1,805,175 | Hanak | May 12, | 1931 |
| 1,876,904 | Francis | Sept. 13, | 1932 |